United States Patent [19]

Vrabel et al.

[11] Patent Number: 4,893,109

[45] Date of Patent: Jan. 9, 1990

[54] AIRBAG ELECTRICAL IGNITER READINESS DETECTOR

[75] Inventors: Robert J. Vrabel, Sterling Heights; Dennis W. Rhee, Bloomfield Hills; Michael R. Seeger, Saline, all of Mich.

[73] Assignee: Ford Motor Company, Dearborn, Mich.

[21] Appl. No.: 253,480

[22] Filed: Oct. 5, 1988

[51] Int. Cl.$^4$ .................. B60Q 1/00; B60R 21/32
[52] U.S. Cl. ..................... 340/438; 340/436; 340/514; 340/516; 180/271; 280/735; 307/10.1
[58] Field of Search ............. 340/52 H, 52 R, 514, 340/505, 511, 438, 436, 516; 307/10 R, 9.1, 10.1, 10.6; 280/735–737, 802; 180/271, 274, 282

[56] References Cited

U.S. PATENT DOCUMENTS

| | | | |
|---|---|---|---|
| 3,601,655 | 8/1971 | Andersen | 307/10 R |
| 3,622,974 | 11/1971 | Best et al. | 340/52 H |
| 3,629,816 | 12/1971 | Gillund | 340/61 |
| 3,633,159 | 1/1972 | Dillman et al. | 340/52 H |
| 3,668,627 | 6/1972 | Brainerd | 340/52 H |
| 3,714,627 | 1/1973 | Dillman et al. | 340/52 H |
| 3,745,523 | 7/1973 | Lewis et al. | 340/52 H |
| 3,767,002 | 10/1973 | Gillund | 340/52 H |
| 3,774,151 | 11/1973 | Lewis et al. | 340/52 H |
| 3,818,431 | 6/1974 | Hosaka | 340/52 H |
| 3,863,208 | 1/1975 | Balban | 340/52 H |
| 3,889,232 | 6/1975 | Bell | 340/52 H |
| 3,916,376 | 10/1975 | Tuttle | 340/52 H |
| 3,921,129 | 11/1975 | Sumida | 340/52 H |
| 4,016,426 | 4/1977 | Nishioka | 340/52 H |
| 4,020,453 | 4/1977 | Spies et al. | 340/52 H |
| 4,059,822 | 11/1977 | Toshioka et al. | 340/52 H |
| 4,117,730 | 10/1978 | Spies et al. | 340/52 H |
| 4,158,191 | 6/1979 | Rogers et al. | 340/52 H |
| 4,163,268 | 7/1979 | Spies et al. | 307/10 R |
| 4,220,871 | 9/1980 | Yasui et al. | 340/52 H |
| 4,222,030 | 9/1980 | Yasui et al. | 340/52 H |
| 4,243,971 | 1/1981 | Suchowerskyj et al. | 340/52 H |
| 4,287,431 | 9/1981 | Yasui et al. | 307/10 R |
| 4,359,715 | 11/1982 | Langer et al. | 340/52 H |
| 4,366,465 | 12/1982 | Veneziano | 340/52 H |
| 4,614,876 | 9/1986 | Mattes et al. | 307/10 R |

Primary Examiner—Donnie L. Crosland
Attorney, Agent, or Firm—Paul K. Godwin, Jr.; Clifford L. Sadler

[57] ABSTRACT

Method and apparatus for periodically checking the critical resistance value of an airbag igniter ("squib") component and determining if the resistance exceeds a predetermined maximum value.

10 Claims, 3 Drawing Sheets

4,893,109

AIRBAG ELECTRICAL IGNITER READINESS DETECTOR

BACKGROUND OF THE INVENTION

1. Field of the Invention

The present invention is directed to the field of automotive airbag deployment systems and more specifically to the area of diagnostic systems for detecting faults within the air bag deployment circuit.

2. Background Information

As discussed in commonly assigned U.S. Pat. Nos. 4,359,715 and 4,366,465 (incorporated herein by reference), it is important to provide a diagnostic subsystem for an airbag deployment system that continually checks the continuity of the circuit which comprises the wiring harness, electrical connectors, various crash sensors and electrically responsive explosive igniters (squibs). The igniters are conventionally wired to associated electrical connectors that provide shorting paths around the igniters when the connectors are disconnected (unmated). Such shorting insures that voltages induced into the wiring of a disconnected igniter will not accidentally energize the igniter and cause accidental airbag deployment. The diagnostic system of the aforementioned patents senses for shorts and provides an alarm to the vehicle operator to warn of disconnected connectors and other faults which would constitute an inoperable system.

In such a diagnostic system, each crash sensor switch is shunted by a known resistance value and the electrical igniter constitutes a known resistance value. The diagnostic system provides a low current through the igniter and crash sensor circuit and detects changes in voltage levels that appear at critical points throughout the system.

SUMMARY OF THE INVENTION

In laboratory tests, it has been found that some airbag deployment igniter elements may suffer chemical changes that cause resistance to change from a normally 1 ohm value to a value in excess of 4 ohms. When an igniter element's resistance value degrades to that level, there is a potential that, in the event a crash actuated deployment is required, the normal actuation voltage applied to the igniter will result in below-threshold current that will fail to cause the igniter to explode. Prior art continuity diagnostics are not sensitive enough to detect these subtle changes in igniter resistance.

The present invention is intended to periodically apply a predetermined low energy electrical pulse to the igniter. The duration and value of the pulse are selected so that, when added to the constant diagnostic current through the igniter will still remain well below that threshold sufficient to trigger the igniter element. During the pulse, the voltage drop across the igniter is detected and compared with values that are predetermined as being within a acceptable range. In the event the igniter resistance has increased beyond an acceptable value, a warning is then provided to the vehicle operator so that appropriate service, such as replacement of the igniter element, can be obtained.

It is therefore an object of the present invention to provide an airbag electrical igniter readiness detector which functions alongside a diagnostic system that supplies DC current through the igniter to verify the connection integrity of the crash sensing system.

It is a further object of the present invention to provide a microcomputer controlled resistance sensing device in which accurate comparison can be achieved to sense resistance changes in the 1 to 4 ohm range.

It is a further object of the present invention to provide an apparatus that periodically provides a controlled duration pulse of current to an igniter element while measuring the corresponding voltage drop and protecting the igniter from potential failures that may occur in the apparatus itself.

DESCRIPTION OF THE PREFERRED EMBODIMENT

Figure 1:
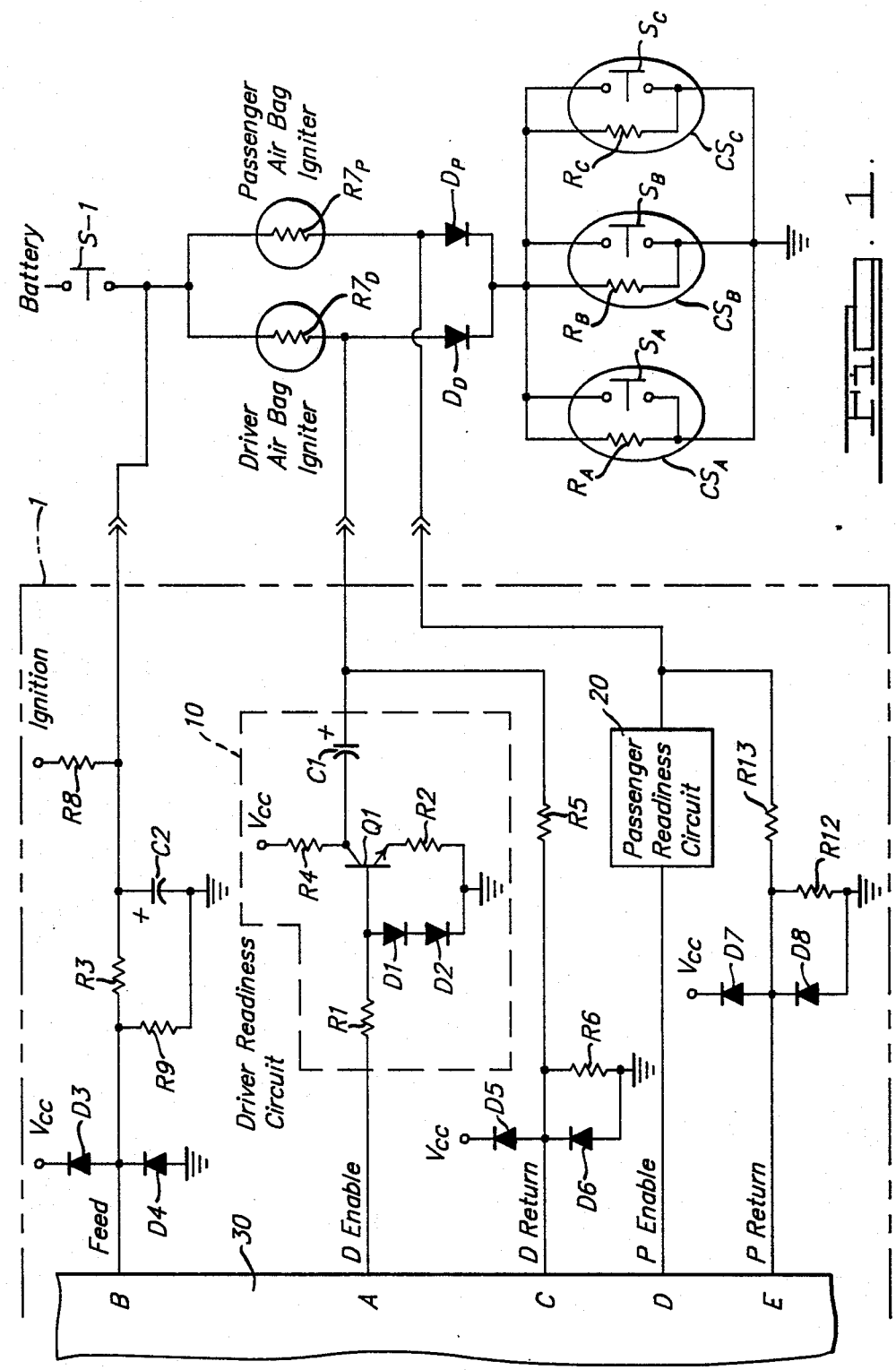
FIG. 1 is a schematic diagram illustrating components employed to implement the present invention.

FIG. 1 constitutes a simplified schematic of the crash sensor and airbag igniter portions of an airbag deployment system of the type shown in the commonly assigned patents mentioned above. Power is supplied from a vehicle electrical source such as a battery (or alternator/generator) to a normally open deceleration sensor switch S-1. A driver airbag igniter element (commonly called a "squib") has a resistance value $R7_D$ that is normally on the order of 1 ohm. Similarly a passenger airbag igniter element has a resistance value $R7_P$ that is also on the order of 1 ohm. One side of the driver airbag igniter and the passenger airbag igniter are commonly connected to the switch S-1. A diode $D_D$ is connected in series with the other side of driver airbag igniter resistance $R7_D$; and a diode $D_P$ is connected in series with the other side of passenger airbag igniter resistance $R7_P$. The cathodes of the diodes $D_D$ and $D_P$ are commonly connected to a plurality of crash sensors $CS_A$, $CS_B$ and $CS_C$ that are physically located at separate points on the front of the vehicle. The crash sensors $CS_A$, $CS_B$ and $CS_C$ respectively contain a normally open crash sensor switch $S_A$, $S_B$ and $S_C$. In addition, the crash sensors respectively contain shunt resistors $R_A$, $R_B$ and $R_C$ that are connected in parallel between the cathodes of the diodes $D_D$ and $D_P$, and ground.

The readiness detector module 1 is shown within the dashed lines of FIG. 1. A resistor R8 is shown connected to an ignition terminal which provides a regulated voltage to the crash sensor components to supply the diagnostic current for continuity checking. Normally, during vehicle operation, the voltage applied to the ignition terminal is approximately 14 volts D.C. That voltage, when dropped across R8, the parallel igniters $R7_D$ and $R7_7$, and parallel crash sensor shunt resisters $R_A$, $R_B$ and $R_C$ is sufficient to provide for a 15 ma current to flow through each airbag igniter. Since the normal igniter resistance $R7_D$ and $R7_P$ is 1 ohm, a 15 millivolt drop occurs across each resistance. This is insufficient to cause an explosive reaction by the igniters.

In order to activate the igniters and therefore inflate each associated airbag in the event of a crash, the deceleration sensor S1 must close to supply voltage directly from the battery to the parallel igniters. Upon sensing a crash through one of the crash sensors during deceleration, the crash circuit is completed by providing a short directly to ground. Full current flows through the igniters and causes them to trigger the inflation of an associated air bag device (not shown).

The current requirement to activate the igniters is approximately 3 amps for at least 3 ms. Therefore, in a 12 to 14 volt battery source system, the igniter resistance should not be allowed to increase beyond approximately 4 ohms without sacrificing reliability that the igniter will be deployed when needed. This is especially critical in the event a battery voltage is charged to a level that is below 12 volts.

The readiness detector of the present invention periodically checks the resistance of the respective driver airbag igniter and passenger airbag igniter and is shown in module 1. Within module 1, a driver readiness circuit 10 is shown in detail and a passenger readiness circuit 20 is indicated, along with a microcomputer 30. The components that comprise passenger readiness circuit 20 are identical to those that comprise the driver readiness circuit 10. Therefore the passenger readiness circuit 20 is only represented as a labeled block.

Since the normal diagnostic current (15 MA) dropped across a normal 1 ohm resistance value for $R7_D$ causes a voltage drop of approximately 15 millivolts, such a small voltage drop is not resolvable by the microcomputer 30. Therefore, a larger voltage drop is needed to properly detect the resistance value of $R7_D$.

The driver readiness circuit 10 includes an NPN transistor Q1 having its collector connected through a resistance R4 to a regulated power supply Vcc. The emitter of the transistor Q1 is connected through a current limiting resistor R2 to ground. Diodes D1 and D2 are connected in series between the base of transistor Q1 and ground. A resistor R1 is also connected to the base of transistor Q1 and to a D Enable line extending from terminal "A" on the associated, microcomputer 30. The collector of transistor Q1 is also connected to a coupling capacitor C1 that protects the igniter from reacting if the transistor Q1 should become permanently shorted.

A pulse forming circuit is made up of resistor R3, R9 and capacitor C2, connected to the junction between the deceleration switch S1, R8, and the parallel igniters. The junction between resistors R3 and R9 is connected to a Feed line extending from terminal B of the microcomputer 30. Diodes D3 and D4 are connected to the Feed line between a regulated Vcc and ground in order to provide transient protection for the microcomputer at terminal B.

A pair of resistors R5 and R6 are connected in series between the junction formed between the coupling capacitor C1 and igniter $R7_D$, and ground. The junction between resistors R5 and R6 is connected to a D Return line extending from terminal C of the microcomputer 30. Diodes D5 and D6 are connected between the Vcc terminal and ground to provide transient protection to the microcomputer at terminal C.

The driver readiness circuit 10 provides for a momentary pulse of current to be drawn through the driver airbag igniter resistance $R7_D$. The enablement of circuit 10 that controls the duration of the pulse is provided by the microcomputer 30. In this case the current pulse is limited to no more than 250 ma for a period of approximately 500 microseconds. During that time, the microcomputer 30 reads the voltage present on the Feed line and on the D Return line. A difference is then derived between those sampled voltages and the difference is compared with a maximum permitted value that is permanently stored. If the resistance value of $R7_D$ is determined as exceeding the maximum permitted value, an alarm signal is provided through a warning lamp or audio alarm (not shown).

In operation, the microcomputer provides a high logic enable pulse on the D Enable line for approximately 500 microseconds. The enabling pulse momentarily sources current to the base of transistor Q1, which switches from its nonconducting to its conducting state for the 500 microseconds. At that point, a fairly low resistance path is created between $R7_D$ and ground, through Q1 and R2. That change causes capacitor C2 to discharge through the driver airbag igniter resistance $R7_D$, the coupling capacitor C1, transistor Q1 and resistor R2 to ground.

The microcomputer 30 is programmed to read the analog voltage on the Feed line through its terminal B and read the analog voltage present on the D Return line at its terminal C during the time the 500 microsecond pulse is applied. The microcomputer 30 temporarily stores those read values and then determines the voltage drop across the igniter as the difference between the two read voltages. The difference constitutes the voltage drop across the igniter and is proportional to the resistance of the igniter. The resistance is then compared to a limit value. If the measured resistance is found to exceed the limit value, a warning is displayed to the operator.

The passenger readiness circuit 20 functions in an identical manner to the driver readiness circuit 10 but at a separate time and is intended to provide a measurement check of the resistance value $R7_P$ of the passenger airbag igniter. The P Return line extending from terminal E of the microcomputer 30 functions the same way as the D Return line extending from terminal C. The P Return line is connected to a resistor R12 connected to ground and a resistor R13 connected to the output line of the passenger readiness circuit 20. Diodes D7 and D8 are connected between the Vcc terminal and ground to provide transient protection for the microcomputer at terminal E.

Figure 2A:
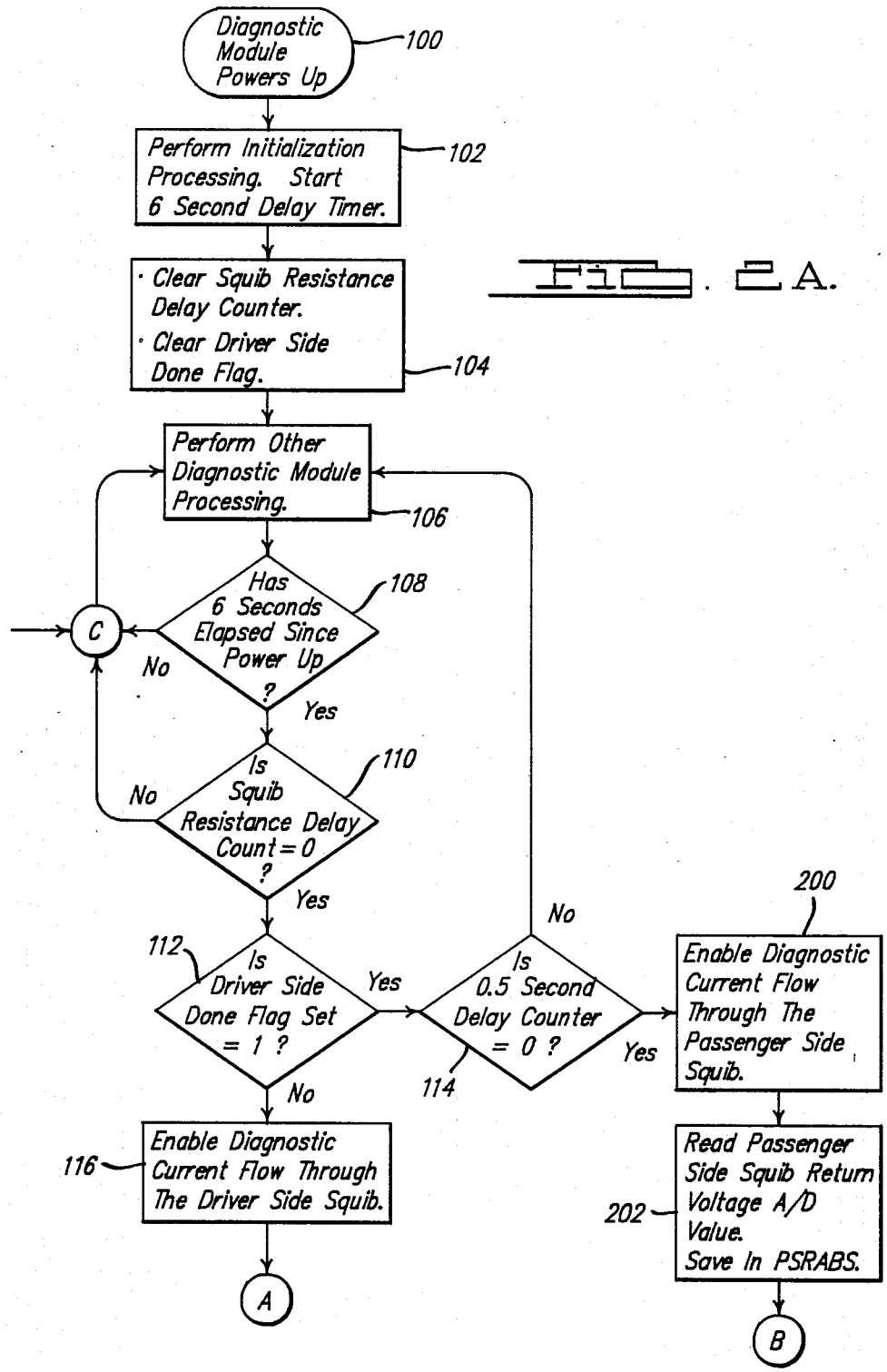
FIGS. 2A and 2B constitute a flow diagram of the program employed by the microcomputer to implement the invention.
Figure 2B:
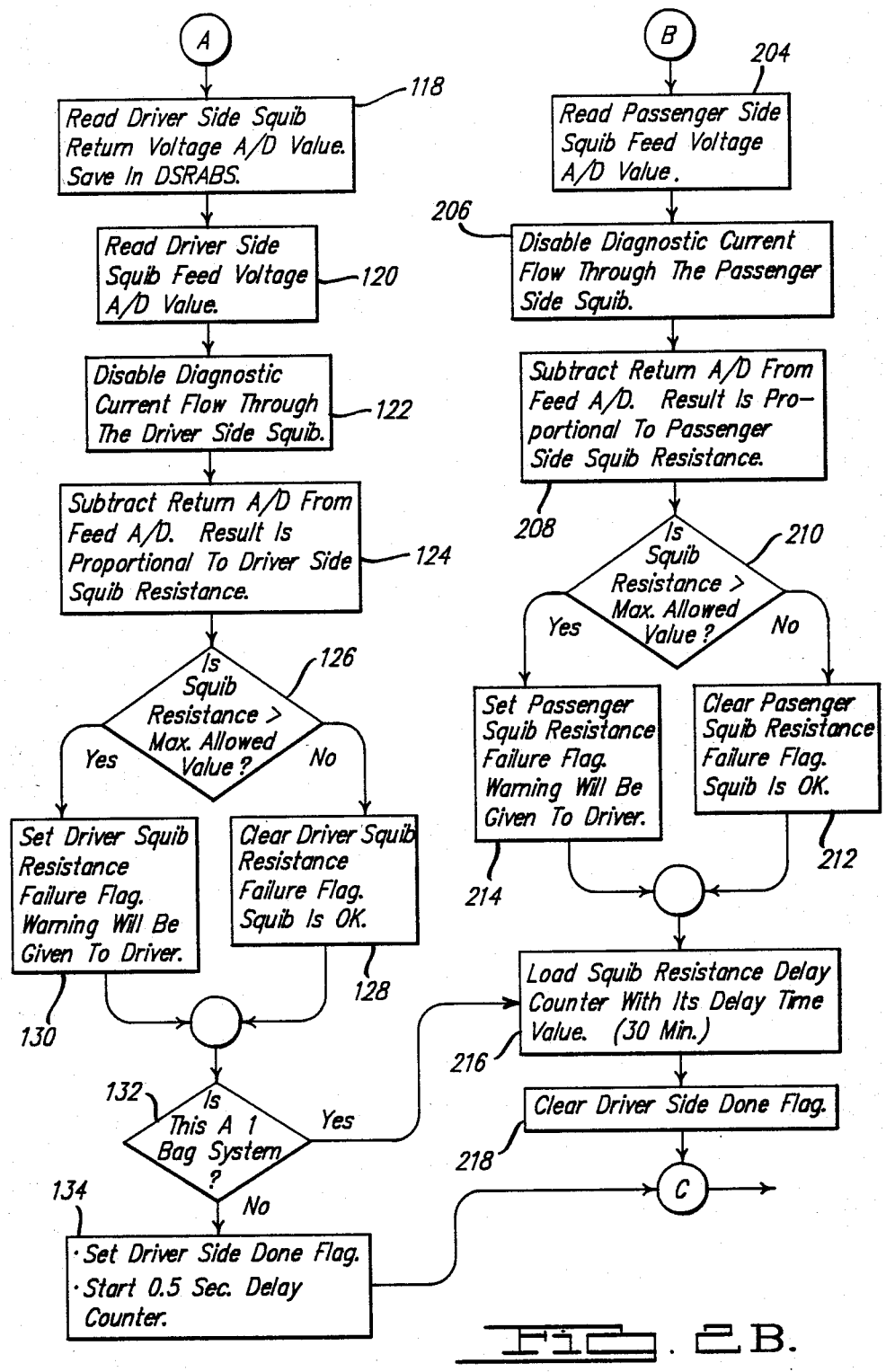

As stated above, the microcomputer 30 is programmed to provide the periodic checking of the resistance values for both the driver airbag igniter and the passenger airbag igniter. The flow chart in FIGS. 2A and 2B provides an understanding of how the microcomputer 30 is programmed to control the circuit shown in FIG. 1.

In the program of the microcomputer 30, the diagnostic module is first powered up when the vehicle is turned on and the engine is started. After an initialization process has been performed at instruction 100, a Six Second Delay Timer is started at instruction 102 that allows sufficient time for the capacitors C1 and C2 to charge. Instruction 104, clears a Squib Resistance Delay Counter to zero. This Squib Resistance Delay Counter normally provides the periodic timing period between the squib resistance checks (30 minutes). However, during initialization it is set to zero so that an immediate check will be made following power up. A Driver Side Done Flag is also cleared at instruction 104 to indicate that the resistance check has not yet been made of the driver airbag igniter.

Instruction 106 commences other diagnostic module processing, such as the continuity checks described above.

At instruction 108, a check is made to determine whether or not the Delay Timer has counted six seconds since power up. If the six seconds have not elapsed, the system returns to instruction 106. However, if six seconds have elapsed since power up, a Squib Resistance Delay Counter is checked at instruction 110 to see if the count is at zero. If it is not at zero the system returns to instruction 106. If the Squib Resistance Delay Counter is at zero, as it is in the case following power up, a check is then made to see if the Driver Side Flag is set to "1". If the Driver Side Flag had been set to "1", the program would determine if the 0.5 Second Delay Counter is at zero at instruction 114 before performing a check of the passenger side squib. However, since the Driver Side Down Flag was cleared at instruction 104, after power up, the program progresses to instruction 116.

Instruction 116 enables diagnostic current to flow through the driver side squib. (As discussed earlier, that enabling signal is conveyed on terminal A of the microcomputer 30 on the D Enable line as a high logic level having a duration of approximately 500 microseconds.) By continuing on to instruction 118 in FIG. 2B, the analog voltage on the D Return line connected to terminal C of the microcomputer 30 is read and stored as a digital value in a "DSRABS" memory location. Instruction 120 reads the driver side squib voltage on the Feed line at terminal B and stores the voltage as a digital value. Subsequently, the current flow through the driver side squib is disabled at instruction 122 and transistor Q1 is biased to its nonconducting state.

The digital value corresponding to the analog voltage read on the P Return line is subtracted from the digital value corresponding to the analog voltage read on the Feed line at instruction 124. The result is proportional to the driver side squib resistance value $R7_D$. A comparison is then made at instruction 126 to determine whether the squib resistance is greater than a predetermined maximum allowed value. If the squib resistance is less than the maximum allowed value, instruction 128 clears the Driver Squib Resistance Failure Flag to indicate that the squib resistance is within the acceptable level, and "OK". If, however, it is determined that the squib resistance has increased to a value greater than that which is allowed, the Driver Squib Resistance Failure Flag is set at instruction 130 so that a warning will be given to the driver.

In the event it is determined that the vehicle is a single airbag (driver side only) system at instruction 132, the Squib Resistance Delay Counter is loaded with a delay time value of 30 minutes at instruction 216 and the Driver Side Done Flag is cleared at instruction 218. However if this is a dual airbag system, the Drive Side Done Flag is set at instruction 134 and the 0.5 Second Delay Counter is started so that the passenger squib can be checked 0.5 seconds later.

After either instruction 218 or 134, the program returns through "C" to instruction 106 in FIG. 2A.

If this is a dual airbag system, and the program progressed to instruction 134, the Squib Resistance Delay Count at instruction 110 will remain at zero until the resistance of the passenger side has been checked. Now that the Driver Side Done Flag is set to "1" at instruction 134, the decision at instruction 112 will be "YES" and a check will be made to see if the 0.5 Second Delay Counter has counted down to zero at instruction 114. If the delay counter has counted down to zero, the program enables the diagnostic current to flow through the passenger side squib at instruction 200 by enabling the P Enable line extending from terminal D and thereby activating the passenger readiness circuit 20. At instruction 202 the analog voltage on the R Return line connected to terminal E is read and stored as a digital value in a "PSRABS" memory location. Referring to FIG. 2B, instruction 204 reads the passenger side squib analog voltage on the Feed line at terminal B and stores the voltage as a digital value. Following that reading, the diagnostic current flow through the passenger side squib is disabled at instruction 206. As in the driver squib check, the passenger enablement of the diagnostic current pulse through the resistance $R7_P$ is limited to 250 ma for the approximately 500 microseconds between instructions 200 and 206.

Instructions 208, 210, 212 and 214 are functionally identical to instructions 124, 126, 128 and 130 described above.

In a vehicle containing a dual airbag system, the 30 minute delay counter will be loaded at instruction 216 so that the next interrogation of the two igniter squibs will again be made when instruction 110 indicates that the delay counter has counted down to zero or the vehicle has been turned off and powered up again.

The apparatus and method of implementation which comprise this invention provide significant improvements to airbag deployment systems. However, it will be apparent that many modifications and variations may be implemented without departing from the scope of the novel concept of this invention. Accordingly, it is intended by the appended claims to cover all such modifications and variations which fall within the true spirit and scope of the invention.

We claim:

1. In an automotive air bag deployment system containing an explosive igniter that is responsive to inflate an air bag when energized with an electrical current of a predetermined minimum value for a predetermined minimum time period, an apparatus for periodically checking the resistance of the igniter without causing said igniter to responsively inflate said air bag, comprising:
    means for applying a predetermined low energy electrical pulse to said igniter, the duration and value of said pulse being selected to be less than said predetermined minimums and therefor insufficient to cause the igniter to reactively explode;
    means for detecting the voltage drop across said igniter when said pulse is applied, comparing said detected voltage drop with values within a predetermined acceptable range, and providing a warning when said voltage drop is outside said acceptable range.

2. An apparatus as in claim 1, wherein said detecting means measures the voltage present on one side of the igniter as a first measured value and measures the voltage present on the other side of the igniter as a second measured value during the time said pulse is applied to said igniter and subtracts said second value from said first value to derive a measured voltage drop across said igniter.

3. An apparatus as in claim 2, wherein said detecting means compares said measured voltage drop with a predetermined limit for an acceptable measured voltage.

4. An apparatus as in claim 1, wherein said detecting means is a microcomputer programmed to read the analog voltage present on one side of the igniter as a first measured value and reads the analog value present on the other side of the igniter as a second measured value during the time said pulse is applied to said igniter, to convert said first and second values to digital signal representations, and to subtract said second value from said first value to derive a measured voltage drop across said igniter.

5. An apparatus as in claim 4, wherein said microcomputer is further programmed to compare said measured voltage drop with a predetermined limit for an acceptable measured voltage, and to output a warning signal when said measured voltage drop is determined to exceed said predetermined limit.

6. In an automotive air bag deployment system containing an explosive igniter that is responsive to inflate an air bag when energized with an electrical current of a predetermined minimum value for a predetermined minimum time period, a method for periodically checking the resistance of the igniter without causing said igniter to responsively inflate said air bag, comprising the steps of:
applying a predetermined low energy electrical pulse to said igniter, the duration and value of said pulse being selected to be less than said predetermined minimums and therefore insufficient to cause the igniter to reactively explode;
detecting the voltage drop across said igniter when said pulse is applied;
comparing said detected voltage drop with values within a predetermined acceptable range; and
providing a warning when said voltage drop is outside said acceptable range.

7. A method as in claim 6, wherein said step of detecting includes the steps of measuring the voltage present on one side of the igniter as a first measured value, measuring the voltage present on the other side of the igniter as a second measured value during the time said pulse is applied to said igniter, and subtracting said second value from said first value to derive a measured voltage drop across said igniter.

8. An apparatus as in claim 7, wherein said step of detecting further includes the step of comparing said measured voltage drop with a predetermined limit for an acceptable measured voltage.

9. A method as in claim 6, wherein said step of detecting is performed with a microcomputer programmed to read the analog voltage present on one side of the igniter as a first measured value, to read the analog value present on the other side of the igniter as a second measured value during the time said pulse is applied to said igniter, to convert said first and second values to digital signal representations, and to subtract said second value from said first value to derive a measured voltage drop across said igniter.

10. A method as in claim 9, wherein said microcomputer is further programmed to compare said measured voltage drop with a predetermined limit for an acceptable measured voltage, and to output a warning signal when said measured voltage drop is determined to exceed said predetermined limit.

* * * * *